Sept. 29, 1959 G. R. BEARDSLEY 2,906,252
CRANKCASE VENTILATING SYSTEM FOR INTERNAL COMBUSTION ENGINES
Filed Aug. 28, 1956 2 Sheets-Sheet 2
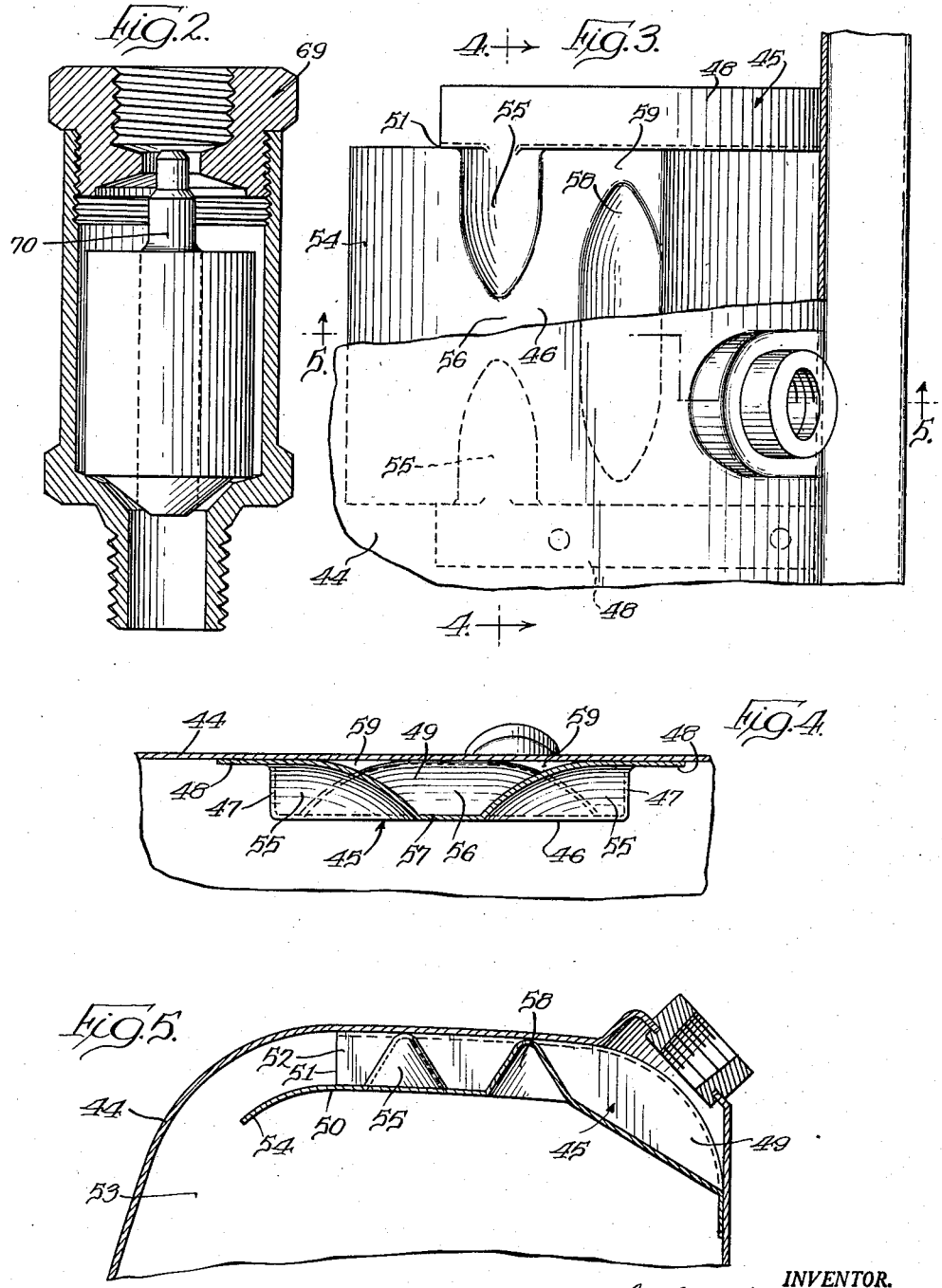
INVENTOR.
Gale R. Beardsley
BY Paul O. Pippel
Atty.

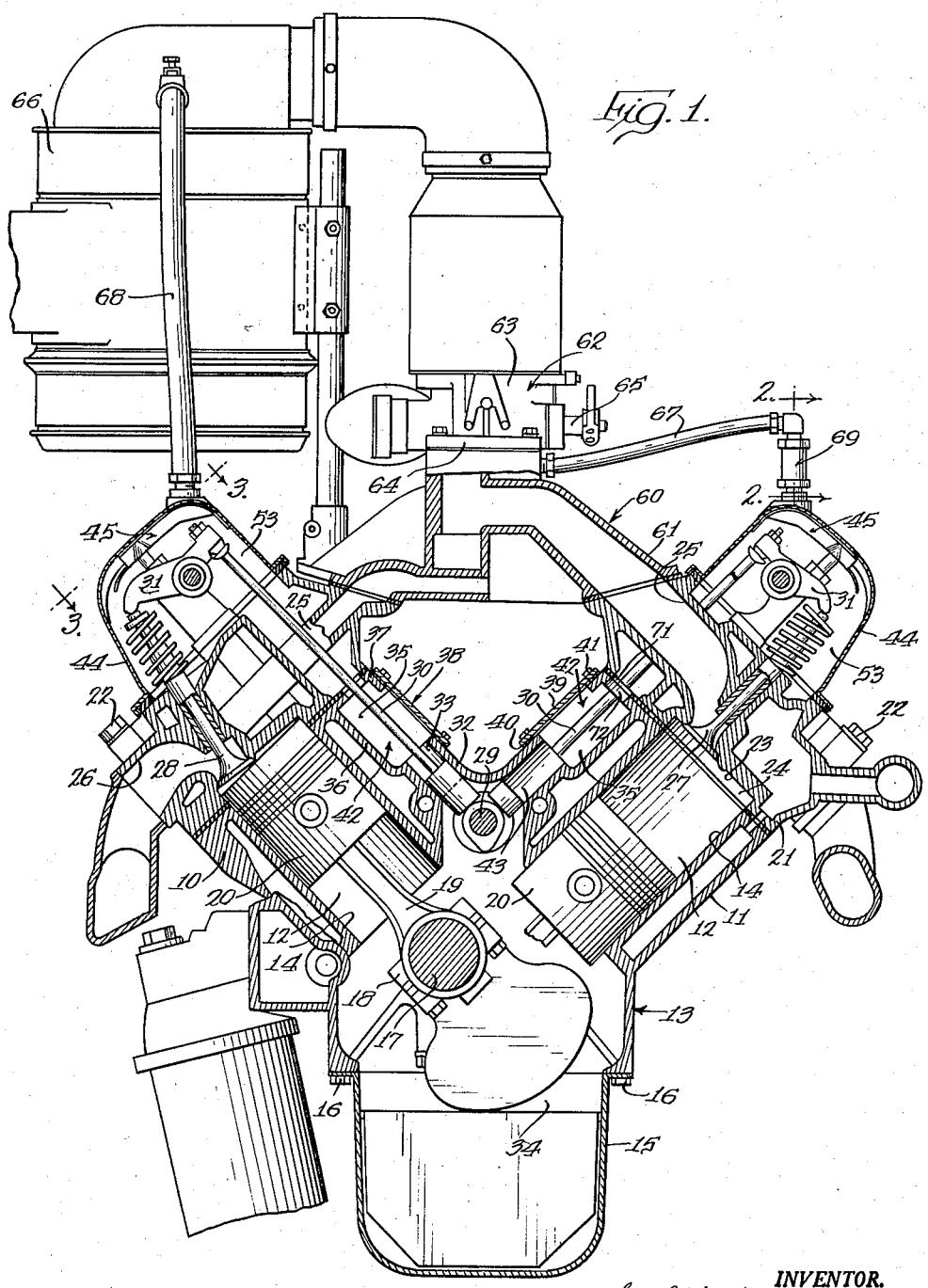

United States Patent Office 2,906,252
Patented Sept. 29, 1959

2,906,252

CRANKCASE VENTILATING SYSTEM FOR INTERNAL COMBUSTION ENGINES

Gale R. Beardsley, Fort Wayne, Ind., assignor to International Harvester Company, a corporation of New Jersey Application August 28, 1956, Serial No. 606,705

10 Claims. (Cl. 123—119)

This invention relates to improvements in internal combustion engines and more particularly to an engine crankcase ventilating system for use with internal combustion engines of the V-block type.

It has been conclusively proven that if the gas or vapor such as water and unburnt fuel entering the lubricating oil-containing crankcase during the operation of the engine by leakage past the pistons, is not continually removed, the lubricating oil will become contaminated by dilution. To obviate this undesirable condition most present-day engines are provided with ventilating or scavenging means for continually passing air through the engine crankcase to remove the oil diluents therefrom. Generally the current of air is developed by establishing communication between the crankcase interior and a source of vacuum or sub-atmospheric pressure and is usually accomplished by utilizing the suction existing in the intake manifold or the carburetor air intake whereby the condensible vapors, which would otherwise dilute the oil, are withdrawn from the crankcase.

In those crankcase ventilating systems which utilize the vacuum or suction existing in the intake manifold or the carburetor air intake as a source of vacuum, the air entering the crankcase must be filtered and substantially free of dust particles and other foreign matter since the air ultimately flows to the engine combustion chambers where the same is burned. If the air flowing through the crankcase chamber to the combustion chambers is not substantially free of dust, etc., the dirt is deposited on the interiors of the engine cylinders and on the pistons to adversely affect the operation of the engine. Furthermore, if the air is ladened with dust the abrasive action of the dust causes excessive wear of the moving engine parts. Thus in most prior crankcase ventilating systems a special filtering device is provided for filtering the air entering the crankcase. It will be appreciated that the provision of special filtering devices for the crankcase ventilating air adds to the cost of the engine and in V-type engines wherein two cylinder banks are placed at an angle with respect to each other the cost of the necessary filtering units is doubled.

The problem of efficiently ventilating the crankcase of a V-type internal combustion engine crankcase is a great deal more difficult than the problem of ventilating an in-line engine crankcase since the crankcase of a V-type internal combustion engine is more complex and provided with a great deal more air passages therethrough. It is therefore the primary objective of the present invention to provide a crankcase ventilating system for a V-type internal combustion engine which operates efficiently to withdraw harmful fumes and gases or vapors from the crankcase without the need of employing special filtering units for the incoming air.

Another object of the invention is to provide a novel crankcase ventilating system for a V-type internal combustion engine in which the interception and draining back to the crankcase of any excessive oil that may be carried by or suspended in the gas or vapor, as well as the condensing of the oil from the gas or vapor before the vapor is discharged into the combustion chambers of the engine is insured to thereby reduce oil loss and lower the engine oil consumption.

A more specific object is to provide a novel passage means for conducting the crankcase vapors to the intake manifold which includes a series of baffles mounted in the valve gear covers whereby the direction of vapor flow is changed several times to thereby cause the oil particles in the vapor to separate from the vapor and return to the oil reservoir or sump; the relatively large surface area of the inexpensive baffles further promote condensation of the oil from the vapors before the vapors are discharged to the intake manifold.

A further object is to provide a crankcase ventilating system for a V-type internal combustion engine wherein clean air from the air cleaner is admitted to the engine at the high point on one valve cover and flows downwardly through one valve gear train compartment and valve gear compartment into the crankcase and upwardly through the opposite valve gear compartment and valve gear train compartment to a similar high point on the opposite valve cover.

Still another object is to utilize the differential of pressure existing between the air in the engine air cleaner and the intake manifold in order to induce circulation of the deleterious fumes and vapors within the engine and to expel them to the engine combustion chambers without loss or escape of lubricant from the crankcase.

The foregoing and other important objects and desirable features inherent in and encompassed by the invention, together with many of the purposes and uses thereof, will become readily apparent from a reading of the ensuing description in conjunction with the annexed drawings, in which:

Figure 1 is a vertical transverse sectional view of an internal combustion engine having the invention incorporated therein;

Figure 2 is a sectional view taken substantially along the line 2—2 of Figure 1 showing the vacuum metering valve;

Figure 3 is a plan view taken substantially along line 3—3 of Figure 1, partially broken away, of a portion of a valve gear train cover;

Figure 4 is a sectional view taken substantially along line 4—4 of Figure 3; and Figure 5 is a sectional view taken substantially along line 5—5 of Figure 3.

Referring to the drawings in detail, wherein like reference characters designate like elements throughout the various views, a V-type internal combustion engine is shown which includes two banks 10, 11 of cylinders arranged at an angle with respect to each other to form a "V," as best shown in Figure 1. Each bank 10 and 11 of the engine disclosed has four separate cylinder bores 12 arranged parallel with one another and spaced longitudinally along the length of the engine. The cylinder bores 12 are defined by open-ended cylindrical walls 14 and, as best illustrated in Figure 1, the banks 10 and 11 are cast or formed whereby their lower ends are integrally connected. The banks 10 and 11 form the engine cylinder block 13 and the left-hand bank 10, as viewed in Figure 1, has elements and features of construction and operation, hereinafter to be described, exactly like those of the right-hand bank 11 which will be referred to in detail. A flanged oil pan 15 is fastened to the lowermost edges of the banks 10 and 11 by means of bolts 16 and serves as a sump or reservoir for the engine lubricating oil.

Rotatably supported by the cylinder block structure 13 in a crankshaft 17 to which the lower ends 18 of connecting rods 19 are journaled. The opposite ends of the connecting rods 19 are operatively connected to the pistons 20 (only two are shown in Figure 1) which are slidable in the cylinders 12. A cylinder head 21 is secured to the upper end of each bank 10 and 11 by means of bolts 22 and close the upper ends of the cylinders 12. The underside of each cylinder head 21 is formed with a plurality of depressions 23, each of which is positionable over a respective cylinder 12 and cooperates therewith to form a combustion chamber 24. The combustible air-fuel mixture is admitted to the combustion chamber 24 through cored passages 25 formed in the cylinder heads 21 and likewise the products of combustion are discharged from the combustion chambers through passages 26, also formed in the cylinder heads 21. An intake valve 27 is disposed in each passage 25 for controlling the flow of air-fuel mixture to its respective cylinder 12. The flow of exhaust gases from the cylinders 13 is controlled by exhaust valves 28 disposed in the passages 26. The valves 27 and 28 are actuated by a camshaft 29 driven by the crankshaft 17 through the media of push rods 30 and rocker arms 31 in a conventional manner. As shown in Figure 1, a longitudinally extending wall 32 structurally interconnects the lower inner edges of the cylinder banks 10 and 11. The lower ends of the push rods 30 are slidably mounted in bores 33 extending through the wall 32. From the foregoing it will be appreciated that a crankcase chamber 34 extends substantially the entire length of the engine and is defined by the oil pan 15 and the cylinder block structure 13 which includes the wall 32. Inasmuch as each of the eight cylinders 12 opens into the crankcase chamber 34, the gas or vapor which inevitably leaks between the pistons 20 and the cylinder walls 14 during the operation of the engine accumulates within the crankcase chamber 34 to deteriorate the oil contained therein if not efficiently removed therefrom.

An upwardly facing, generally rectangular pocket 35 is formed along the inner side of each cylinder bank 10 and 11. The pockets 35 extend longitudinally substantially the entire length of the engine and are partially defined by the central wall 32 and the upwardly inclined walls 36 adjacent to the cylinder walls 14. The open end of each pocket 35 is defined by a continuous flat surface 37, each of said flat continuous surfaces 37 lying in a plane substantially parallel and spaced from a respective inclined wall 36. A cover assembly, designated generally by numeral 38, is provided for closing each opening of a respective pocket 35. Each cover assembly 38 includes a cover 39, the peripheral edge 40 of which is in the form of a flange which is adapted to abut a gasket member positioned upon a respective flat surface 37 when the cover assembly 38 is assembled on the cylinder block structure 12. A plurality of bolts 41 are employed for fastening the covers 39 to the cylinder block structure 12. The enclosed pockets 35 define valve chambers, designated generally by numeral 42, which are disposed above the crankcase chamber 34. As shown in Figure 1, the valve chambers 42 are in communication with the crankcase chamber 34 by means of openings 43 extending through the wall 32 substantially parallel to the valve tappet bores 33 but longitudinally spaced therefrom.

Fastened to the top surface of each cylinder head 21 is a sheet metal cover 44 having a substantially U-shaped cross section, as viewed in Figures 1 and 5, which serves as an air and dirt-tight enclosure for the rocker arms, valve return springs and other mechanism operatively interconnecting the upper ends of the push rods 30 and the intake and exhaust valves 27 and 28, respectively. Each cover 44 is provided with a baffle or oil separator 45, the purpose of which will be explained hereinafter. Referring to Figures 3, 4 and 5 in detail, wherein the sheet metal cover 44 and baffle 45 are best illustrated, it will be noted that the baffle 45 extends somewhat transversely with respect to the longitudinal axis of the cover 44 and is spaced intermediate the ends of the cover. The baffle 45 has a generally U-shaped cross section, as viewed in Figure 4, to provide a web 46 and a pair of upstanding legs 47. The legs 47 are provided with oppositely extending flanges 48 which are curved to conform to the underside of the sheet metal cover 44 and are welded thereto. The baffle 45 and the sheet metal cover 44 define a generally transversely extending space 49. One edge 50 of the web 46 and the edges 51 of the legs 47 partially define an opening 52 between the space 49 and the entire space 53 enclosed by the cover 44. A lip 54 is integrally formed with and extends downwardly from the marginal edge 50 of the web 46 and flares away from the underside of the cover 44. The section of the web adjacent the edge 50 is provided with a pair of longitudinally spaced bulged portions 55, each of which extends from a respective leg 47 longitudinally toward the end of the other bulged portion. The bulged portions 55 are substantially V-shaped in cross sections as viewed in Figure 5, with the apex of each engaging the underside of the cover 34 at the legs 37. It will be noted that the end of each bulged portion 55 where the apex merges into the general plane of the web 36 is longitudinally spaced from the other end to thus provide a restricted opening 56 defined by the underside of the cover 34 the apexes of the bulged portions 55 and the web portion 57 extending longitudinally between the apexes of the bulged portions 55. Transversely spaced from the bulged portions 55 which are substantially in longitudinal alignment is a single centrally located bulged portion 58. The bulged portion 58 is also substantially V-shaped as viewed in Figure 5 with the central section of the apex engaging the underside of the cover 34. Each end of the bulged portion 58 where it merges into the general plane of the web 36 is longitudinally spaced from a respective leg 47, such that a pair of openings 59 are formed. Each opening 59 which is longitudinally offset from the opening 56 is defined by the underside of cover 34, approximately one-half of the apex portion of the bulged portion 58, a leg 37 and a web portion extending between a respective leg 37 and an end of the bulged section.

Position in the V-space between the banks 10 and 11 is an intake manifold 60 which is secured to the cylinder heads 21. The intake manifold includes a plurality of distributing branches or conduits 61, each of which has an end in registration with a respective inlet passage 25. Reference character 62 indicates a charge-forming device such as a conventional down draft carburetor having an air inlet 63 at its upper end and an air-fuel mixture outlet 64 at its lower end which is secured to the intake manifold 60. As in conventional installations the air-fuel mixture flows from the carburetor outlet 64 to the intake manifold 60 where it is distributed through the branch lines 61 to the passages 25 and the quantity of air-fuel mixture flowing in the intake manifold is controlled by a butterfly-type plate throttle valve 65 interposed between the air inlet 63 and the air-fuel mixture outlet 64 in the carburetor 62. An air cleaner 66, which may be of any conventional type without departing from the spirit and scope of the invention, has an outlet in communication with the air inlet of the carburetor 62 and serves as the means for supplying filtered clean air to the carburetor, where it is combined with fuel to form the combustible mixture in a conventional manner.

From the foregoing it will be appreciated that five separate and distinct longitudinally extending chambers or passages are formed within the interior of the engine, namely, crankcase chamber 34, two valve chambers 42 and two spaces 53 enclosed by the covers 44 which are each in communication with an adjacent chamber or space. As stated previously, it is one of the important objects of the present invention to continuously ventilate the interior of the engine in a particular manner during engine operation and thereby insure greater efficiency in engine performance without experiencing an excessive rate of oil consumption. To accomplish this objective the pressure of the air existing in one space 53 is maintained higher than the pressure existing in the other space 53 and since the interior of the engine is divided into compartments or chambers which are in communication with each other in a particular manner air enters the engine at one space 53 flows downwardly through one valve chamber 42 into the crankcase chamber 34 and then upwardly into the other valve chamber 42 to the space 53 having the relatively lower air pressure existing therein. In order to establish the pressure differential to effect flow of air from one space 53 to the other space 53, the space 53 disposed on the right-hand bank 11 is connected to a source of vacuum or sub-atmospheric pressure by means of a conduit 67 and the space 53 disposed on the left bank 10 is in communication with air under atmospheric pressure by virtue of a conduit 68. As is well known when the engine is operating the pressure in the intake manifold 60 and in the carburetor 62 down stream from the throttle valve 65 is below atmospheric pressure. Thus one end of the conduit 67 is provided with suitable pipe fittings and threaded into a threaded recess provided in the intake manifold casting. The opposite end of the conduit 67 is fastened to the cover 44 on the right bank 11 to establish fluid communication between the intake manifold 60 and the space 49. The left-hand space 49, on the other hand, is in communication with the air cleaner 66. Thus when the engine is operating a portion of the filtered air flowing through the air cleaner 66 under atmospheric pressure flow through the conduit 68 to the space 53 on the left-hand bank 10. It will be appreciated that the air supplied to ventilate the interior of the engine is kept relatively free from dirt and foreign matter to prevent contamination of the engine lubricating oil. Furthermore, since the ventilating air enters at substantially one of the highest points on the engine and leaves the engine at a similar high point at the other side of the engine, the possibility of the water vapor condensing within the interior of the engine is largely eliminated by eliminating pockets or areas below the air inlet and outlet which are not continually within the path of the air flowing through the interior of the engine.

Interposed in the conduit 67 is a vacuum metering device 69 which automatically regulates the flow of air through the conduit 67 under various operating conditions of the engine. Inasmuch as the metering device 69 per se forms no part of the present invention, the details of the device will not be described in detail. However, it is to be understood that the device 69 includes a weighted valve 72 which is constructed in such a way as to tend to restrict the rate at which the vaporous fluid formed by operation of the engine may flow into the inlet manifold 60 as the inlet manifold vacuum increases. However, it is to be understood that the valve moves in response to the flow from the engine to the inlet manifold in such a way as to prevent an increase in flow proportional to increases in inlet manifold vacuum and functions to maintain a relatively constant volume of air circulating through the interior of the engine regardless of the condition under which the engine is operating; that is, regardless of the degree of vacuum existing in the intake manifold 60.

As pointed out hereinbefore each sheet metal cover is provided with an oil separating baffle 45. In operation as the vapor flows from the space 53 enclosed by the cover 44 on the right cylinder bank 11 to the conduit 67 it first must pass through the opening 52 to the restrictive opening 56, the bulged portions 55 acting as baffles. The vapor fluid then must change its direction substantially 90° and pass through the openings 59 before flowing through the conduit 67. Because the direction of the vapor flow is changed several times when passing from the space 53 on the right-hand bank 11 before flowing to the conduit 67, oil particles carried in the vapor are caused to separate therefrom and return to the oil reservoir or sump at the bottom of the crankcase chamber 34 by gravity. It will be noticed that the free edge of the lip 54 lies substantially in a vertical plane to facilitate the draining of the oil particles by gravity. Furthermore, the relatively large surface area of the portions 55 and 58 promote condensation of the oil from the vapor before the vapors are drawn into the intake manifold 60. Ultimately, the oil which condenses will drain to the valve chamber 42 on the right bank 11 through the registering openings 71 and 72 formed in the cylinder head 21 and the cylinder block 12, respectively, to the valve chamber 42 and subsequently return to the crank case chamber 34 through to the openings 43. The air which is ultimately discharged to the intake manifold 60 from the right-hand space 53 is substantially free of lubricating oil and is composed principally of noxious products of combustion such as water, fuel, etc.

The embodiment of the invention shows for the purposes of illustration and description herein is that preferred for achieving the objects of the invention and developing the utility thereof in a most desirable manner, due regard being had to existing factors of economy, simplicity of design and construction and the improvements sought to be effected. It will be appreciated therefore that the particular structural and functional aspects emphasized herein are not intended to exclude but rather to suggest such other adaptations and modifications of the invention as fall within the spirit and scope of the invention as defined in the appended claims.

What is claimed is:

1. In a ventilating system for overhead valve, V-type internal combustion engines or the like comprising, a cylinder block structure having a pair of upwardly diverging cylinder banks to provide an intervening V-space between the banks, apex of said V-space being defined by a substantially horizontal longitudinally extending wall integrally formed with and connecting said banks, said block structure further including a rectangular wall depending from said banks, an oil pan secured to the lower marginal edge of said rectangular wall, said rectangular wall, longitudinally extending wall, and said oil pan partially defined in a crank case chamber, each of said cylinder banks having a pocket formed in one side thereof, said pocket being partially defined by said longitudinally extending wall, a cover mounted on said cylinder bank over each of said pockets to enclose the same, said longitudinally extending wall having openings therethrough for establishing communication between each of said pockets of said crankcase chamber, a cylinder head mounted on each of said cylinder banks, a cover assembly fastened to the top of each cylinder head, each of said cylinder heads and a respective cover assembly partially defining an enclosed compartment, each of said cylinder heads being provided with apertures in registry with apertures in a respective cylinder bank to establish communication between said enclosed compartment and said pockets, an air cleaner, an intake manifold mounted on said engine and in communication with said air cleaner, a carburetor interposed between said air cleaner and said intake manifold, a first conduit having one end connected to one of said cover assemblies and having its opposite end connected to the filtered air side of said air cleaner, and a second conduit having one end connected to the other valve cover and its opposite end connected to said intake manifold.

2. The ventilating system substantially as set forth in claim 1, in which, said cover assembly connected to said second conduit is provided with baffle means for separating oil mist and droplets from air passing through the compartment enclosed thereby.

3. In a ventilating system for overhead valve, V-type internal combustion engines or the like comprising, a substantially hollow block structure having a pair of upwardly diverging cylinder banks and a rectangularly shaped, downwardly facing opening, an oil pan secured to said block structure over said downwardly facing opening, an upwardly facing pocket formed in the side of each said cylinder banks, a longitudinally extending wall defining the juncture of said banks and the bottom of said pockets, said wall further separating the said pockets from a crankcase chamber partially defined by said oil pan and a portion of said block structure, said wall being provided with openings therethrough for establishing communication between said chamber and the interior of said pockets, a cover assembly mounted on said block structure over each of said upwardly facing openings; a cylinder head mounted on the top of each of said cylinder banks; a valve gear train cover mounted on top of each of said cylinder heads, said valve gear train covers and said cylinder heads defining enclosed, longitudinally extending compartments, each of said enclosed compartments being in communication with the interior of a respective pocket; and means for subjecting the interior of one of said enclosed compartments to a source of vacuum and the other of said enclosed compartments to a source of air under atmospheric pressure when said engine is in operation.

4. The ventilating system substantially as set forth in claim 3, in which, one of said enclosed compartments contains baffle means for separating oil mist and droplets from air passing through said compartment.

5. In a ventilating system for overhead valve, V-type internal combustion engine or the like comprising, a substantially hollow block structure having a pair of upwardly diverging cylinder banks and partially defining a central, longitudinally extending crank case chamber, a valve chamber formed in each of said cylinder banks vertically spaced above said crank case chamber and separated therefrom by a longitudinally extending wall, said wall having openings therein for establishing communication between said valve chambers and said crank case chamber, an enclosed valve train chamber vertically spaced above and in communication with a respective valve chamber; and means for subjecting one of said enclosed valve train chambers to a source of vacuum and the other of said enclosed valve train chambers to a source of air under atmospheric pressure when said engine is in operation.

6. In a ventilating system for V-type internal combustion engines or the like, the combination of an engine having a crankcase chamber, a pair of valve chambers vertically spaced above said crankcase chamber and horizontally spaced with respect to each other, said valve chambers being in communication with said crankcase chamber, and valve gear train chambers vertically spaced above each of said valve chambers, each of said valve gear train chambers being in communication with a respective valve chamber and being partially defined by a cover assembly having an aperture in the uppermost surface thereof, and means for introducing air under atmospheric pressure through the aperture in one of said cover assemblies and means for drawing air through the aperture of the other of said cover assemblies.

7. In a ventilating system substantially as set forth in claim 6, in which, one of said cover assemblies is provided with baffle means secured to the underside of said cover assembly adjacent the aperture therein for separating oil mist and droplets from air passing through said enclosed compartment to said aperture.

8. In a ventilating system for V-type internal combustion engines or the like, a combination of an engine having a pair of upwardly diverging cylinder bank structures, each of said cylinder bank structures having vertically spaced top intermediate, top and bottom longitudinally extending compartments therein, said bottom longitudinally extending compartment being common for both cylinder bank structures and in communication with said intermediate longitudinally extending compartments, said top longitudinally extending compartments being in communication with a respective intermediate longitudinally extending compartment, means for introducing air under atmospheric pressure at an uppermost area of one of said top longitudinally extending compartments and means for discharging air from the other of said top longitudinally extending compartments at an uppermost area thereof.

9. In a ventilating system for overhead, valve V-type internal combustion engines or the like, the combination of a V-type engine having upwardly diverging cylinder bank structures, a central longitudinally extending crank case chamber below the apex of said cylinder bank structures, said cylinder bank structures including a longitudinally extending enclosed compartment disposed at the free end of each leg of said cylinder bank structures, means for establishing communication between each of said enclosed compartments and said crank case chamber, and means for subjecting one of said enclosed compartments to a source of vacuum and the other of said enclosed compartments to a source of air under atmospheric pressure.

10. In a ventilating system substantially as set forth in claim 9, in which, the combination includes an air cleaner, an intake manifold for supplying the engine with a combustible air-fuel mixture, and a carburetor interposed between said intake manifold and air cleaner, a conduit leading from the said means for introducing air under atmospheric pressure to said one of said enclosed compartments including a conduit leading from the filtered air side of said air cleaner to said enclosed compartment and said means for connecting said other of said enclosed compartments to a source of vacuum including a conduit having one end connected to said intake manifold and its opposite end connected to said other of said compartments.

References Cited in the file of this patent

UNITED STATES PATENTS

| | | |
|---|---|---|
| 1,654,147 | Shannon | Dec. 27, 1927 |
| 2,056,762 | Barr et al. | Oct. 6, 1936 |
| 2,198,790 | Roddewig | Apr. 30, 1940 |